United States Patent
Li et al.

(10) Patent No.: US 10,382,204 B2
(45) Date of Patent: Aug. 13, 2019

(54) MOBILE TERMINAL PRIVACY PROTECTION METHOD AND PROTECTION APPARATUS, AND MOBILE TERMINAL

(71) Applicant: Huawei Technologies Co., Ltd., Shenzhen (CN)

(72) Inventors: Tengyue Li, Shenzhen (CN); Zijun Li, Shenzhen (CN); Haoying Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/561,344

(22) PCT Filed: Mar. 31, 2015

(86) PCT No.: PCT/CN2015/075517
§ 371 (c)(1),
(2) Date: Sep. 25, 2017

(87) PCT Pub. No.: WO2016/154898
PCT Pub. Date: Oct. 6, 2016

(65) Prior Publication Data
US 2018/0062846 A1 Mar. 1, 2018

(51) Int. Cl.
*H04L 29/06* (2006.01)
*H04L 9/32* (2006.01)
(Continued)

(52) U.S. Cl.
CPC ............ *H04L 9/3231* (2013.01); *G06F 21/32* (2013.01); *G06F 21/602* (2013.01)

(58) Field of Classification Search
CPC ............................ H04L 9/3231; G06F 21/602
See application file for complete search history.

(56) References Cited

U.S. PATENT DOCUMENTS

| 4,775,595 A | 10/1988 | Hasegawa |
| 2007/0113097 A1 | 5/2007 | Wang |

(Continued)

FOREIGN PATENT DOCUMENTS

| CN | 102467462 A | 5/2012 |
| CN | 102880560 A | 1/2013 |

(Continued)

OTHER PUBLICATIONS

Nazir et al., "User Authentication for Mobile Device through Image Selection", IEEE, p. 518-520, (Year: 2009).*

(Continued)

*Primary Examiner* — Morshed Mehedi
(74) *Attorney, Agent, or Firm* — Conley Rose, P.C.

(57) ABSTRACT

A mobile terminal privacy protection method and protection apparatus, and a mobile terminal, where the method includes obtaining an application start instruction, actively obtaining a biometric feature of a user according to the application start instruction, and displaying an encrypted content list and an unencrypted content list of a corresponding application if the obtained biometric feature of the user matches a preset biometric feature. The encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature. Hence, the present disclosure can protect privacy in the mobile terminal without being easily perceived.

15 Claims, 5 Drawing Sheets

(51) Int. Cl.
*G06F 21/32* (2013.01)
*G06F 21/60* (2013.01)

(56) References Cited

U.S. PATENT DOCUMENTS

| | | | |
|---|---|---|---|
| 2009/0083847 A1 | 3/2009 | Fadell et al. | |
| 2009/0210722 A1* | 8/2009 | Russo | H04L 9/0866 713/189 |
| 2011/0072264 A1* | 3/2011 | McNulty | G06F 21/32 713/168 |
| 2012/0252411 A1 | 10/2012 | Johnsgard et al. | |
| 2012/0291121 A1 | 11/2012 | Huang et al. | |
| 2013/0318625 A1* | 11/2013 | Fan | H04L 9/3231 726/27 |
| 2014/0085460 A1* | 3/2014 | Park | G06F 21/84 348/135 |
| 2014/0095870 A1* | 4/2014 | Dewan | H04L 9/0866 713/167 |
| 2014/0292666 A1* | 10/2014 | Shi | G06F 3/0416 345/173 |
| 2014/0298268 A1* | 10/2014 | Kang | G06F 3/04847 715/841 |
| 2016/0042166 A1* | 2/2016 | Kang | G06F 21/32 726/7 |
| 2016/0212103 A1* | 7/2016 | Rhoads | H04W 12/02 |

FOREIGN PATENT DOCUMENTS

| | | |
|---|---|---|
| CN | 102902935 A | 1/2013 |
| CN | 103427990 A | 12/2013 |
| CN | 103581417 A | 2/2014 |
| CN | 103605459 A | 2/2014 |
| CN | 104239107 A | 12/2014 |
| CN | 104239778 A | 12/2014 |
| EP | 2713298 A1 | 4/2014 |
| JP | H0792908 B2 | 10/1995 |
| JP | 2001051987 A | 2/2001 |
| JP | 2010541046 A | 12/2010 |
| JP | 2013152641 A | 8/2013 |
| JP | 2014514654 A | 6/2014 |

OTHER PUBLICATIONS

Foreign Communication From a Counterpart Application, Chinese Application No. 201580020988.0, Chinese Office Action dated Sep. 30, 2018, 11 pages.
Foreign Communication From a Counterpart Application, European Application No. 15886884.4, Extended European Search Report dated Jan. 23, 2018, 7 pages.
Machine Translation and Abstract of Chinese Publication No. CN102880560, Jan. 16, 2013, 16 pages.
Machine Translation and Abstract of Chinese Publication No. CN102902935, Jan. 30, 2013, 15 pages.
Machine Translation and Abstract of Chinese Publication No. CN103427990, Dec. 4, 2013, 17 pages.
Machine Translation and Abstract of Chinese Publication No. CN103581417, Feb. 12, 2014, 11 pages.
Machine Translation and Abstract of Chinese Publication No. CN103605459, Feb. 26, 2014, 17 pages.
Machine Translation and Abstract of Chinese Publication No. CN104239107, Dec. 24, 2014, 19 pages.
Machine Translation and Abstract of Chinese Publication No. CN104239778, Dec. 24, 2014, 12 pages.
Foreign Communication From a Counterpart Application, PCT Application No. PCT/CN2015/075517, English Translation of International Search Report dated Jun. 29, 2015, 2 pages.
Foreign Communication From a Counterpart Application, PCT Application No. PCT/CN2015/075517, English Translation of Written Opinion dated Jun. 29, 2015, 8 pages.
Machine Translation and Abstract of Japanese Publication No. JP2001051987, Feb. 23, 2001, 19 pages.
Machine Translation and Abstract of Japanese Publication No. JP2013152641, Aug. 8, 2013, 40 pages.
Foreign Communication From a Counterpart Application, Japanese Application No. 2017-551283, Japanese Office Action dated Oct. 29, 2018, 5 pages.
Foreign Communication From a Counterpart Application, Japanese Application No. 2017-551283, English Translation of Japanese Office Action dated Oct. 29, 2018, 6 pages.

\* cited by examiner

MOBILE TERMINAL PRIVACY PROTECTION METHOD AND PROTECTION APPARATUS, AND MOBILE TERMINAL

CROSS-REFERENCE TO RELATED APPLICATION

This application is a U.S. National Stage of International Patent Application No. PCT/CN2015/075517 filed on Mar. 31, 2015, which is hereby incorporated by reference in its entirety.

TECHNICAL FIELD

The present disclosure relates to the terminal field, and in particular, to a mobile terminal privacy protection method and protection apparatus, and a mobile terminal.

BACKGROUND

As technologies and interpersonal communication develop, a mobile terminal has become an important means for people's communication. The mobile terminal is generally a personal article, but because of factors such as an interpersonal relationship, hard-to-refuse, or politeness, people cannot totally prevent the mobile terminal from being used by other people. There is lots of people's privacy in the mobile terminal, such as a short message service message, a contact, a call log, a photo, and an instant messaging message. People expect that the privacy can be protected when the mobile terminal is used by the other people. To resolve a mobile terminal privacy protection problem, a privacy protection mode is set in most mobile terminals to ensure that a user other than an owner is hard to obtain privacy in the mobile terminal in the privacy protection mode.

In other approaches, the privacy protection mode may be implemented in multiple manners. One method is returning, when the mobile terminal is in the privacy protection mode, virtual data when an application in the terminal is opened. For example, in the privacy protection mode, an opened album may display a blank or only display a non-private photo set by a user. A defect of the method is that setting of the returned virtual data is relatively complex and tedious, and if there are many applications, the setting is more tedious. In addition, if the virtual data setting is not realistic enough, the method is easily perceived by another user, which causes unnecessary embarrassment.

Another method is entering different modes by setting different authentication manners. For example, a privacy mode and a normal operation mode correspond to different passwords, patterns, personal identification number (PIN) codes, and fingerprints. A setting of the method is relatively convenient, but in the method, a user is generally prompted to enter a password, draw a pattern, or scan a fingerprint, and therefore a used mode is easily perceived by the user. For example, the mobile terminal is set to enter different modes according to different passwords. Generally, the normal mode is entered when a correct password is entered, and the privacy protection mode is entered when an incorrect password is entered. In this case, the mobile terminal prompts the user to enter a password, and a lock screen can be unlocked by the user entering any incorrect password. The user knows that the entered password is an incorrect password but the lock screen is unlocked, and therefore the user perceives that the privacy protection mode is entered. Another defect of the method is that authentication information needs to be entered only when the lock screen is to be unlocked, and after the lock screen is unlocked, privacy protection cannot be implemented when the user operates an application.

It can be seen that, in the other approaches, there is no mobile terminal privacy protection method that is convenient and efficient and further can avoid being easily perceived by a user.

SUMMARY

In view of this, an objective of embodiments of the present disclosure is to provide a mobile terminal privacy protection method and protection apparatus, and a mobile terminal in order to resolve problems that a user easily perceives that privacy in the mobile terminal is protected and privacy is not protected when an application is used.

To resolve the foregoing technical problems, the embodiments of the present disclosure disclose the following technical solutions.

According to a first aspect, a mobile terminal privacy protection method is provided, and the method includes obtaining an application start instruction, actively obtaining a biometric feature of a user according to the application start instruction, and displaying an encrypted content list and an unencrypted content list of a corresponding application if the obtained biometric feature of the user matches a preset biometric feature, where the encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature.

With reference to the first aspect, in a first possible implementation manner of the first aspect, after the actively obtaining a biometric feature of a user, the method further includes displaying the unencrypted content list of the application if the biometric feature of the user is not obtained, or displaying the unencrypted content list of the application if the obtained biometric feature of the user does not match the preset biometric feature.

With reference to the first aspect and the first possible implementation manner of the first aspect, in a second possible implementation manner of the first aspect, actively obtaining a biometric feature of a user includes actively obtaining a facial feature of the user, actively obtaining an eye iris feature of the user, or actively obtaining a fingerprint of the user.

With reference to the first possible implementation manner of the first aspect, in a third possible implementation manner of the first aspect, after displaying the unencrypted content list of the application, the method further includes actively obtaining, using a touchscreen of the mobile terminal, a fingerprint entered by the user when operating the unencrypted content list, and displaying the encrypted content list and the unencrypted content list of the application if the actively obtained fingerprint matches the preset biometric feature.

With reference to the first possible implementation manner of the first aspect and the third possible implementation manner of the first aspect, in a fourth possible implementation manner of the first aspect, after displaying the encrypted content list and the unencrypted content list of the application, the method further includes obtaining a first instruction that is entered by the user to open a first entry in the encrypted content list, presenting, according to the first instruction, content corresponding to the first entry, obtaining, according to the first instruction, a biometric feature entered by the user, and setting the first entry to an unencrypted state when the biometric feature entered by the user matches the preset biometric feature.

With reference to the first possible implementation manner of the first aspect and the third possible implementation manner of the first aspect, in a fifth possible implementation manner of the first aspect, after displaying the encrypted content list and the unencrypted content list of the application, the method further includes obtaining a second instruction that is entered by the user to open a second entry in the unencrypted content list, presenting, according to the second instruction, content corresponding to the second entry, obtaining, according to the second instruction, a biometric feature entered by the user, and setting the second entry to an encrypted state when the biometric feature entered by the user matches the preset biometric feature.

With reference to any one of the first aspect to the fifth possible implementation manner of the first aspect, in a sixth possible implementation manner of the first aspect, before obtaining an application start instruction, the method further includes obtaining an unlock instruction entered by the user on a lock screen interface, actively obtaining the biometric feature of the user according to the unlock instruction, and displaying an encrypted application icon and an unencrypted application icon if the obtained biometric feature of the user matches the preset biometric feature, where the encrypted application icon is an application icon that is not presented when the obtained biometric feature of the user does not match the preset biometric feature.

With reference to the first aspect, in a seventh possible implementation manner of the first aspect, after actively obtaining the biometric feature of the user according to the unlock instruction, the method further includes displaying the unencrypted application icon if the biometric feature of the user is not obtained, or displaying the unencrypted application icon if the obtained biometric feature of the user does not match the preset biometric feature.

With reference to any one of the first aspect to the seventh possible implementation manner of the first aspect, in an eighth possible implementation manner of the first aspect, actively obtaining a biometric feature of a user according to the application start instruction further includes obtaining information about a geographic location and an environment in which the mobile terminal is located, and actively obtaining the biometric feature of the user according to the application start instruction if the information about the geographic location in which the mobile terminal is located matches preset geographic location information and/or if the environment information matches preset environment information.

According to a second aspect, a mobile terminal privacy protection method is provided, and the method includes obtaining an unlock instruction entered by a user on a lock screen interface, actively obtaining a biometric feature of the user according to the unlock instruction, and presenting an unlocked first interface if the obtained biometric feature of the user matches a preset biometric feature, where interface elements of the first interface include an encrypted application icon and an unencrypted application icon, where the encrypted application icon is an application icon that is not presented when the obtained biometric feature of the user does not match the preset biometric feature.

With reference to the second aspect, in a first possible implementation manner of the second aspect, an unlocked second interface is presented if the obtained biometric feature of the user does not match the preset biometric feature. An interface element of the second interface includes the unencrypted application icon.

With reference to the second aspect and the first possible implementation manner of the second aspect, in a second possible implementation manner of the second aspect, actively obtaining a biometric feature of the user according to the unlock instruction further includes obtaining information about a geographic location and an environment in which the mobile terminal is located, and actively obtaining the biometric feature of the user according to the application start instruction if the information about the geographic location in which the mobile terminal is located matches preset geographic location information and/or if the environment information matches preset environment information.

According to a third aspect, a mobile terminal privacy protection apparatus is provided, and the apparatus includes an instruction obtaining unit configured to obtain an application start instruction, a biometric feature obtaining unit configured to actively obtain a biometric feature of a user according to the application start instruction, and a display unit configured to display an encrypted content list and an unencrypted content list of a corresponding application if the obtained biometric feature of the user matches a preset biometric feature, where the encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature.

With reference to the third aspect, in a first possible implementation manner of the third aspect, the display unit is further configured to display the unencrypted content list of the application if the biometric feature of the user is not obtained, or the display unit is further configured to display the unencrypted content list of the application if the obtained biometric feature of the user does not match the preset biometric feature.

With reference to the third aspect and the first possible implementation manner of the third aspect, in a second possible implementation manner of the third aspect, the biometric feature obtaining unit includes a photography subunit configured to actively obtain a facial feature of the user, the biometric feature obtaining unit includes a photography subunit configured to actively obtain an eye iris feature of the user, or the biometric feature obtaining unit includes a fingerprint obtaining subunit configured to actively obtain a fingerprint of the user.

With reference to the first possible implementation manner of the third aspect, in a third possible implementation manner of the third aspect, the fingerprint obtaining subunit is further configured to actively obtain, using a touchscreen of the mobile terminal, a fingerprint entered by the user when operating the unencrypted content list, and the display unit is further configured to display the encrypted content list and the unencrypted content list of the application if the actively obtained fingerprint matches the preset biometric feature.

With reference to the first possible implementation manner of the third aspect and the third possible implementation manner of the third aspect, in a fourth possible implementation manner of the third aspect, the instruction obtaining unit is further configured to obtain a first instruction that is entered by the user to open a first entry in the encrypted content list. The display unit is further configured to present, according to the first instruction, content corresponding to the first entry. The biometric feature obtaining unit is further configured to obtain, according to the first instruction, a biometric feature entered by the user, and the apparatus further includes a setting unit configured to set the first entry to an unencrypted state when the biometric feature entered by the user matches the preset biometric feature.

With reference to the first possible implementation manner of the third aspect and the third possible implementation manner of the third aspect, in a fifth possible implementation manner of the third aspect, the instruction obtaining unit is further configured to obtain a second instruction that is entered by the user to open a second entry in the unencrypted content list. The display unit is further configured to present, according to the second instruction, content corresponding to the second entry. The biometric feature obtaining unit is further configured to obtain, according to the second instruction, a biometric feature entered by the user, and the setting unit is further configured to set the second entry to an encrypted state when the biometric feature entered by the user matches the preset biometric feature.

With reference to any one of the third aspect to the fifth possible implementation manner of the third aspect, in a sixth possible implementation manner of the third aspect, the instruction obtaining unit is further configured to obtain an unlock instruction entered by the user on a lock screen interface. The biometric feature obtaining unit is further configured to actively obtain the biometric feature of the user according to the unlock instruction, and the display unit is further configured to display an encrypted application icon and an unencrypted application icon if the obtained biometric feature of the user matches the preset biometric feature, where the encrypted application icon is an application icon that is not presented when the obtained biometric feature of the user does not match the preset biometric feature.

With reference to the third aspect, in a seventh possible implementation manner of the third aspect, the display unit is further configured to display the unencrypted application icon if the biometric feature of the user is not obtained, or the display unit is further configured to display the unencrypted application icon if the obtained biometric feature of the user does not match the preset biometric feature.

With reference to any one of the third aspect to the seventh possible implementation manner of the third aspect, in an eighth possible implementation manner of the third aspect, the apparatus further includes a geographic location and environment information obtaining unit configured to obtain information about a geographic location and an environment in which the mobile terminal is located, where the biometric feature obtaining unit is further configured to actively obtain the biometric feature of the user according to the application start instruction if the information about the geographic location in which the mobile terminal is located matches preset geographic location information and/or if the environment information matches preset environment information.

According to a fourth aspect, a mobile terminal privacy protection apparatus is provided, and the apparatus includes an instruction obtaining unit configured to obtain an unlock instruction entered by a user on a lock screen interface, a biometric feature obtaining unit configured to actively obtain a biometric feature of the user according to the unlock instruction, and a display unit configured to present an unlocked first interface if the obtained biometric feature of the user matches a preset biometric feature, where interface elements of the first interface include an encrypted application icon and an unencrypted application icon, where the encrypted application icon is an application icon that is not presented when the obtained biometric feature of the user does not match the preset biometric feature.

With reference to the fourth aspect, in a first possible implementation manner of the fourth aspect, the display unit is further configured to present an unlocked second interface if the obtained biometric feature of the user does not match the preset biometric feature. An interface element of the second interface includes the unencrypted application icon.

With reference to the fourth aspect and the first possible implementation manner of the fourth aspect, in a second possible implementation manner of the fourth aspect, the apparatus further includes a geographic location and environment information obtaining unit configured to obtain information about a geographic location and an environment in which the mobile terminal is located, where the biometric feature obtaining unit is further configured to actively obtain the biometric feature of the user according to the application start instruction if the information about the geographic location in which the mobile terminal is located matches preset geographic location information and/or if the environment information matches preset environment information.

According to a fifth aspect, a mobile terminal is provided, and the mobile terminal includes a processor configured to obtain an application start instruction, an input device configured to actively obtain a biometric feature of a user according to the application start instruction, and an output device configured to display an encrypted content list and an unencrypted content list of a corresponding application if the obtained biometric feature of the user matches a preset biometric feature, where the encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature.

With reference to the fifth aspect, in a first possible implementation manner of the fifth aspect, the output device is further configured to display the unencrypted content list of the application if the biometric feature of the user is not obtained, or the output device is further configured to display the unencrypted content list of the application if the obtained biometric feature of the user does not match the preset biometric feature.

With reference to the fifth aspect and the first possible implementation manner of the fifth aspect, in a second possible implementation manner of the fifth aspect, the input device is further configured to actively obtain a facial feature of the user, the input device is further configured to actively obtain an eye iris feature of the user, or the input device is further configured to actively obtain a fingerprint of the user.

With reference to the first possible implementation manner of the fifth aspect, in a third possible implementation manner of the fifth aspect, the input device is further configured to actively obtain, using a touchscreen of the mobile terminal, a fingerprint entered by the user when operating the unencrypted content list, and the output device is further configured to display the encrypted content list and the unencrypted content list of the application if the actively obtained fingerprint matches the preset biometric feature.

With reference to the first possible implementation manner of the fifth aspect and the third possible implementation manner of the fifth aspect, in a fourth possible implementation manner of the fifth aspect, the processor is further configured to obtain a first instruction that is entered by the user to open a first entry in the encrypted content list. The output device is further configured to present, according to the first instruction, content corresponding to the first entry. The input device is further configured to obtain, according to the first instruction, a biometric feature entered by the user, and the processor is further configured to set the first entry to an unencrypted state when the biometric feature entered by the user matches the preset biometric feature.

With reference to the first possible implementation manner of the fifth aspect and the third possible implementation manner of the fifth aspect, in a fifth possible implementation manner of the fifth aspect, the processor is further configured to obtain a second instruction that is entered by the user to open a second entry in the unencrypted content list. The output device is further configured to present, according to the second instruction, content corresponding to the second entry. The input device is further configured to obtain, according to the second instruction, a biometric feature entered by the user, and the processor is further configured to set the second entry to an encrypted state when the biometric feature entered by the user matches the preset biometric feature.

With reference to any one of the fifth aspect to the fifth possible implementation manner of the fifth aspect, in a sixth possible implementation manner of the fifth aspect, the processor is further configured to obtain an unlock instruction entered by the user on a lock screen interface. The input device is further configured to actively obtain the biometric feature of the user according to the unlock instruction, and the output device is further configured to display an encrypted application icon and an unencrypted application icon if the obtained biometric feature of the user matches the preset biometric feature, where the encrypted application icon is an application icon that is not presented when the obtained biometric feature of the user does not match the preset biometric feature.

With reference to the fifth aspect, in a seventh possible implementation manner of the fifth aspect, the output device is further configured to display the unencrypted application icon if the biometric feature of the user is not obtained, or the output device is further configured to display the unencrypted application icon if the obtained biometric feature of the user does not match the preset biometric feature.

With reference to any one of the fifth aspect to the seventh possible implementation manner of the fifth aspect, in an eighth possible implementation manner of the fifth aspect, the input device is further configured to obtain information about a geographic location and an environment in which the mobile terminal is located, and the input device is further configured to actively obtain the biometric feature of the user according to the application start instruction if the information about the geographic location in which the mobile terminal is located matches preset geographic location information and/or if the environment information matches preset environment information.

According to a sixth aspect, a mobile terminal is provided, and the mobile terminal includes a processor configured to obtain an unlock instruction entered by a user on a lock screen interface, an input device configured to actively obtain a biometric feature of the user according to the unlock instruction, and an output device configured to present an unlocked first interface if the obtained biometric feature of the user matches a preset biometric feature, where interface elements of the first interface include an encrypted application icon and an unencrypted application icon, where the encrypted application icon is an application icon that is not presented when the obtained biometric feature of the user does not match the preset biometric feature.

With reference to the sixth aspect, in a first possible implementation manner of the sixth aspect, the output device is further configured to present an unlocked second interface if the obtained biometric feature of the user does not match the preset biometric feature. An interface element of the second interface includes the unencrypted application icon.

With reference to the sixth aspect and the first possible implementation manner of the sixth aspect, in a second possible implementation manner of the sixth aspect, the input device is further configured to obtain information about a geographic location and an environment in which the mobile terminal is located, and the input device is further configured to actively obtain the biometric feature of the user according to the application start instruction if the information about the geographic location in which the mobile terminal is located matches preset geographic location information and/or if the environment information matches preset environment information.

The embodiments of the present disclosure provide a mobile terminal privacy protection method. A biometric feature of a user is actively obtained after an application start instruction is obtained, and encrypted content and unencrypted content are displayed if the obtained biometric feature matches a preset biometric feature in order to avoid leakage of user privacy in a mobile terminal and protect the user privacy. In addition, a method for actively obtaining the biometric feature cannot be easily perceived by the user.

It should be understood that, the above general descriptions and the following detailed descriptions are merely examples and cannot limit the protection scope of the present disclosure.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

The specific embodiments of the present disclosure have been shown using the foregoing accompanying drawings, and more detailed descriptions are provided in the following. These accompanying drawings and text descriptions are not intended to limit a conception scope of the present disclosure in any manner, but to describe a concept of the present disclosure for a person skilled in the art with reference to the specific embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

To completely understand the present disclosure, the following detailed description mentions many specific details. However, a person skilled in the art should understand that the present disclosure may be implemented without these specific details. In other embodiments, detailed descriptions of a well known method, process, component, and circuit are omitted such that the embodiments are described without being unnecessarily blurred.

The embodiments of the present disclosure provide a mobile terminal privacy protection method and protection apparatus, and a mobile terminal, to protect user privacy in the mobile terminal without being easily perceived by another user.

Figure 1:
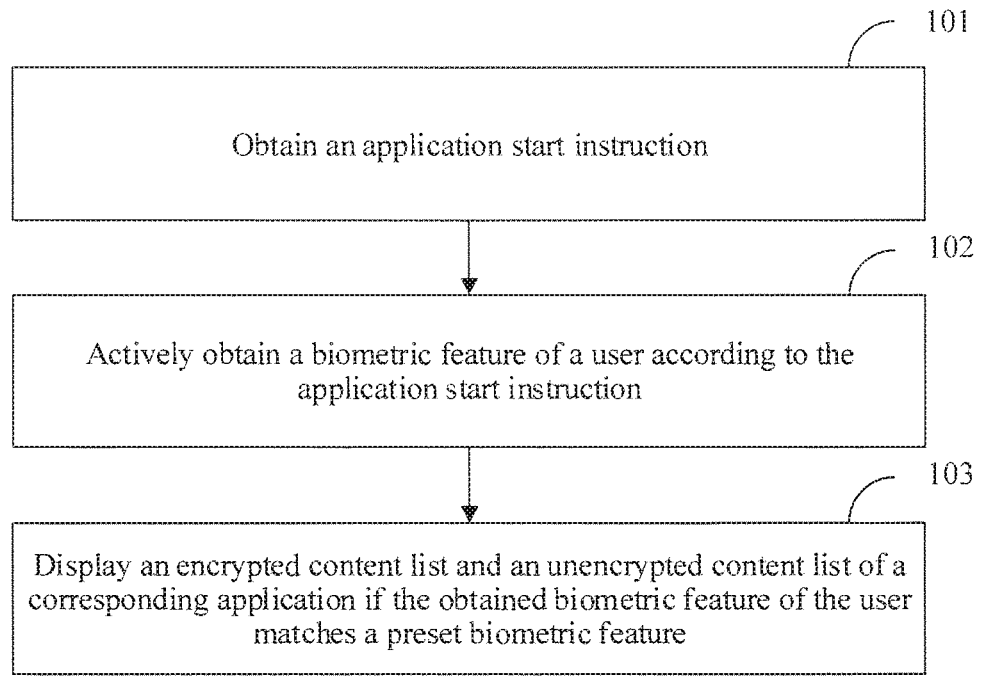
FIG. 1 shows a flowchart of a mobile terminal privacy protection method according to an embodiment of the present disclosure.

FIG. 1 shows a flowchart of a mobile terminal privacy protection method according to an embodiment of the present disclosure. As shown in FIG. 1, the method includes the following steps.

Step 101: Obtain an application start instruction.

An application unit in a mobile terminal may also be referred to as an application, such as an album, a short message service, and a call log. To start the application, a user may touch an application icon, and after the application icon is touched, the application start instruction is generated.

Step 102: Actively obtain a biometric feature of a user according to the application start instruction.

Further, in an implementation manner of actively obtaining the biometric feature, the user does not need to be prompted, the biometric feature of the user can be obtained without permission of the user, and the biometric feature of the user can be obtained when an input instruction for the biometric feature of the user is not obtained. The manner of active obtaining is relatively covert and is not easily perceived by the user.

Step 103: Display an encrypted content list and an unencrypted content list of a corresponding application if the obtained biometric feature of the user matches a preset biometric feature.

The encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature. In brief, the encrypted content may be content that the user does not want another user to see and for which a password is set.

The user may set specific content in the application unit to a status that may include an encrypted state or an unencrypted state. The encrypted content is the content that the user does not want the other user to see. For example, for a photo in an album, the user may set a password for a photo that is not expected to be seen by the other user.

When the obtained biometric feature of the user does not match the preset biometric feature, the content not presented includes at least one element. The element may be a text, a picture, a video, or the like. Generally, one element is presented in a form of one entry. The encrypted content list may present the encrypted content in a form of a list.

Figure 2:
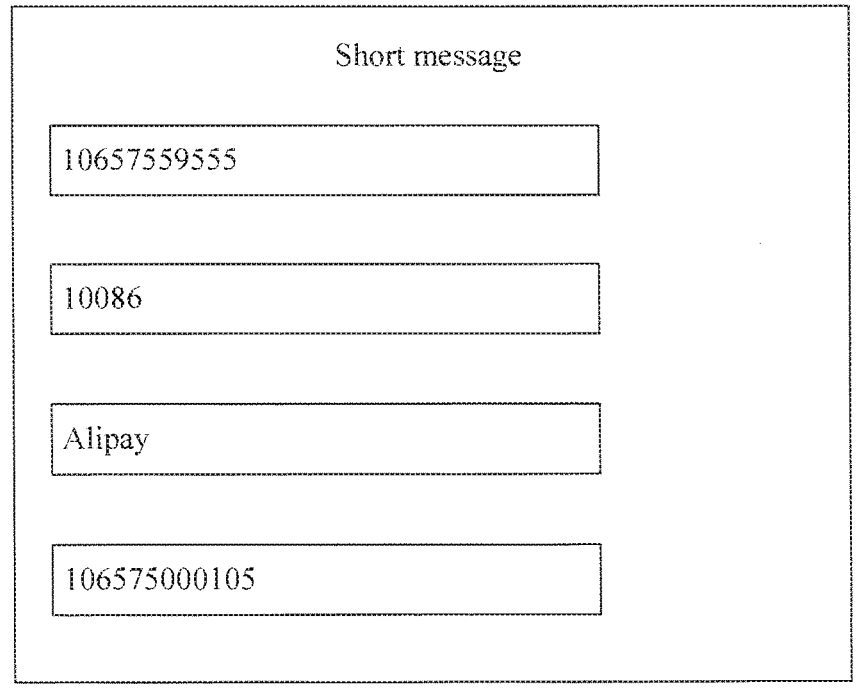
FIG. 2 shows a schematic diagram of displaying a content list according to an embodiment of the present disclosure.
Figure 3:
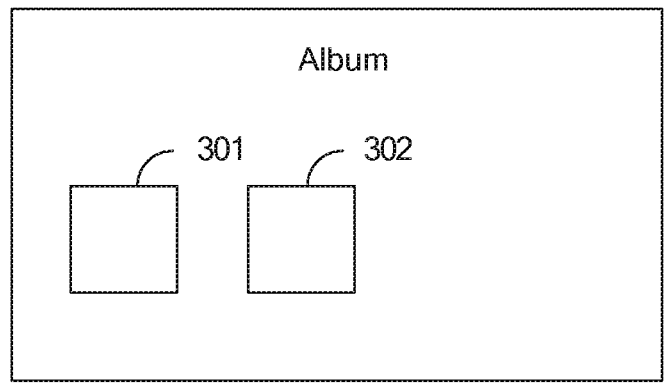
FIG. 3 shows a schematic diagram of displaying an unencrypted content list according to an embodiment of the present disclosure.

In this embodiment of the present disclosure, a list may be understood in a broad sense. For different applications, content lists may be in different forms, which may be a strip list or a block list. For example, if an application is a short message service or an instant messaging program, a content list may be a phone number list of a sender, such as a strip short message service message list shown in FIG. 2, and the list shown in FIG. 2 merely displays a phone number or a name of a sender. If an application is an album, a content list may be a block thumbnail list of a photo shown in FIG. 3, and both 301 and 302 in FIG. 3 are a photo thumbnail. If an application is voice recording software or music playback software, a content list may be a file name list.

In the method according to this embodiment of the present disclosure, a biometric feature of a user is actively obtained after an application start instruction is received, and if a result of matching between the obtained biometric feature and a preset biometric feature displays confidential content and unencrypted content, leakage of user privacy in a mobile terminal can be avoided, and the user privacy is protected. In addition, a method for actively obtaining the biometric feature cannot be easily perceived by the user.

In an embodiment of the present disclosure, after step 103, and after the actively obtaining a biometric feature of a user, the method further includes displaying the unencrypted content list of the application if the biometric feature of the user is not obtained, or displaying the unencrypted content list of the application if the obtained biometric feature of the user does not match the preset biometric feature.

In an embodiment of the present disclosure, the actively obtaining a biometric feature of a user includes actively obtaining a facial feature of the user, actively obtaining an eye iris feature of the user, or actively obtaining a fingerprint of the user.

The fingerprint may be obtained in two manners. One manner is obtaining the fingerprint using a special fingerprint obtainer, and the other manner is obtaining the fingerprint using a screen of the mobile terminal. Positions of fingerprint obtainers of mobile terminals vary with different models of the mobile terminals. For example, a fingerprint obtaining unit of an iPhone is at a home key, and a fingerprint obtaining unit of a HUAWEI mobile phone is on the back of the mobile phone.

Screens of mobile phones of some models may be regarded as a screen fingerprint obtainer, and the fingerprint of the user may be directly obtained by means of a touch of the user on the screens of the mobile terminals. It is more covert to obtain the fingerprint of the user by means of a touch on a screen.

The active obtaining can prevent a user other than an owner from perceiving that a biometric feature is obtained to be used for subsequent verification in order to protect privacy in the mobile terminal and avoid embarrassment that may be caused.

In another embodiment of the present disclosure, a biometric feature obtaining unit may also be an audio obtaining unit that is configured to obtain a voice of the user.

In another embodiment of the present disclosure, after displaying the unencrypted content list of the application, the method further includes actively obtaining, using a touchscreen of the mobile terminal, a fingerprint entered by the user when operating the unencrypted content list, and displaying the encrypted content list and the unencrypted content list of the application if the actively obtained fingerprint matches the preset biometric feature.

If the owner does not face a camera when the application is started, or because of a light problem or a distance problem, the facial feature or the iris feature obtained by the camera may be blurry or distorted, or the actively obtained fingerprint is blurry. Therefore, a subsequent match can hardly succeed, and consequently, the owner can hardly obtain all desired information. In this embodiment of the present disclosure, after the unencrypted content list is displayed because of the foregoing problem, the fingerprint of the user is actively obtained by means of a touch of the user on the screen of the mobile terminal when an entry in the unencrypted content list is selected in order to avoid inconvenience brought to the owner by erroneous determining.

In an embodiment of the present disclosure, after displaying the encrypted content list and the unencrypted content list of the application, the method further includes obtaining a first instruction that is entered by the user to open a first entry in the encrypted content list, presenting, according to the first instruction, content corresponding to the first entry, obtaining, according to the first instruction, a biometric feature entered by the user, and setting the first entry to an unencrypted state when the biometric feature entered by the user matches the preset biometric feature.

In another embodiment of the present disclosure, after displaying the encrypted content list and the unencrypted content list of the application, the method further includes obtaining a second instruction that is entered by the user to open a second entry in the unencrypted content list, presenting, according to the second instruction, content corresponding to the second entry, obtaining, according to the second instruction, a biometric feature entered by the user, and setting the second entry to an encrypted state when the biometric feature entered by the user matches the preset biometric feature.

After viewing the encrypted content and the unencrypted content, when selecting an entry in a list, the owner may change a status of the selected entry by actively entering the biometric feature, that is, set encrypted content to unencrypted content or set unencrypted content to encrypted content. For example, the user opens a photo in a privacy content list, and when the user views the photo, a finger touches a home key again to actively trigger a fingerprint collection command, or touches and holds the screen for a short period of time to actively trigger a screen fingerprint collection command. After a fingerprint match succeeds, a status of the photo may be switched, and if the photo is encrypted, the status of the photo may be switched to unencrypted, or if the photo is unencrypted, the status of the photo may be switched to encrypted. In this embodiment, a method for switching an encrypted state or an unencrypted state of application content by actively triggering a biometric feature obtaining command is convenient, efficient, and relatively covert, and is not easily perceived by another user.

In an embodiment of the present disclosure, before receiving an application start instruction, the method further includes obtaining an unlock instruction entered by the user on a lock screen interface, actively obtaining the biometric feature of the user according to the unlock instruction, and displaying an encrypted application icon and an unencrypted application icon if the obtained biometric feature of the user matches the preset biometric feature.

The encrypted application icon is an application icon that is not presented when the obtained biometric feature of the user does not match the preset biometric feature.

After actively obtaining the biometric feature of the user according to the unlock instruction, the method further includes displaying the unencrypted application icon if the biometric feature of the user is not obtained, or displaying the unencrypted application icon if the obtained biometric feature of the user does not match the preset biometric feature.

In an embodiment of the present disclosure, actively obtaining a biometric feature of a user according to the application start instruction further includes obtaining information about a geographic location and an environment in which the mobile terminal is located, and actively obtaining the biometric feature of the user according to the application start instruction if the information about the geographic location in which the mobile terminal is located matches preset geographic location information and/or if the environment information matches preset environment information.

Generally, a user starts an application by touching an icon of the application in a mobile terminal. In the method according to this embodiment, a biometric feature of a user is actively obtained after an unlock instruction is received, and different application icons are displayed according to whether the biometric feature is obtained and a status of matching between the obtained biometric feature and a preset biometric feature. An application that an owner does not want another user to see or use can be hidden, and leakage of user privacy in the mobile terminal can be further avoided in order to protect the user privacy. In addition, a method of active obtaining cannot be easily perceived by the user.

Figure 4:
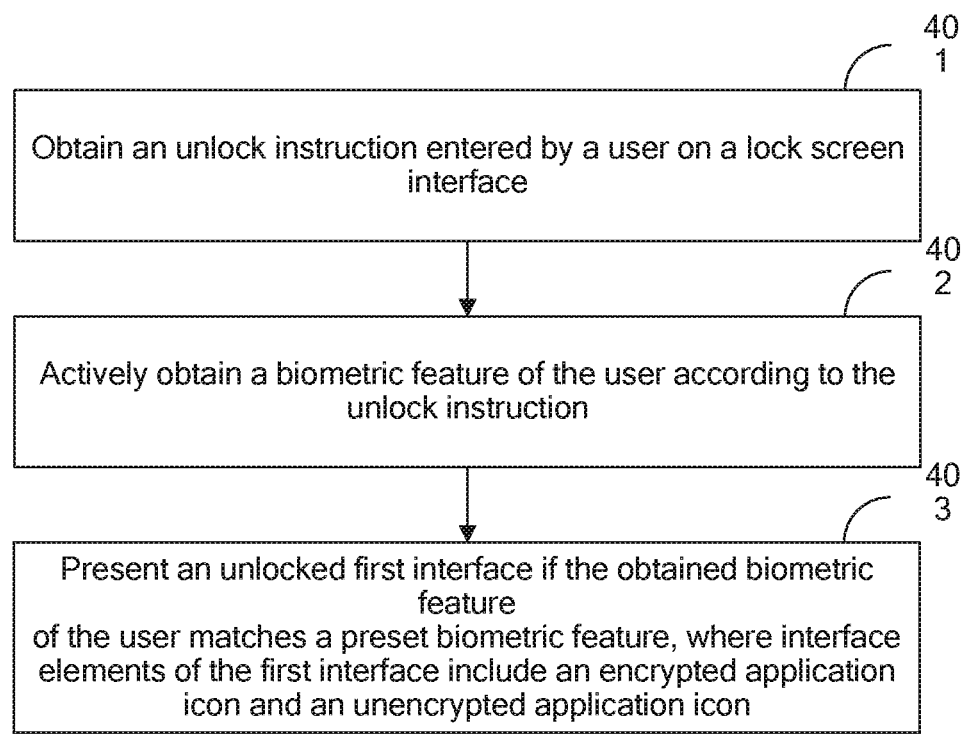
FIG. 4 shows a flowchart of a mobile terminal privacy protection method according to an embodiment of the present disclosure.

FIG. 4 shows a flowchart of a mobile terminal privacy protection method according to an embodiment of the present disclosure. As shown in FIG. 4, the method includes the following steps.

Step 401: Obtain an unlock instruction entered by a user on a lock screen interface.

Step 402: Actively obtain a biometric feature of the user according to the unlock instruction.

Step 403: Present an unlocked first interface if the obtained biometric feature of the user matches a preset biometric feature, where interface elements of the first interface include an encrypted application icon and an unencrypted application icon.

The encrypted application icon is an application icon that is not presented when the obtained biometric feature of the user does not match the preset biometric feature.

An unlocked second interface is presented if the obtained biometric feature of the user does not match the preset biometric feature. An interface element of the second interface includes the unencrypted application icon.

Generally, a user starts an application by touching an icon of the application in a mobile terminal. In the method according to this embodiment, a biometric feature of a user is actively obtained after an unlock instruction is received, different interfaces are displayed according to whether the biometric feature is obtained and a status of matching between the obtained biometric feature and a preset biometric feature, and different application icons are displayed on the different interfaces. An application that an owner does not want another user to see or use can be hidden, and leakage of user privacy in the mobile terminal can be further avoided in order to protect the user privacy. In addition, a method of active obtaining cannot be easily perceived by the user.

In an embodiment of the present disclosure, actively obtaining a biometric feature of the user according to the unlock instruction further includes obtaining information about a geographic location and an environment in which the mobile terminal is located, and actively obtaining the biometric feature of the user according to the application start instruction if the information about the geographic location in which the mobile terminal is located matches preset geographic location information and/or if the environment information matches preset environment information.

For further protecting user privacy, content to be displayed can be determined according to geographic location information and environment information of a mobile terminal. The environment information may include a temperature, humidity, an altitude, and the like.

Figure 5:
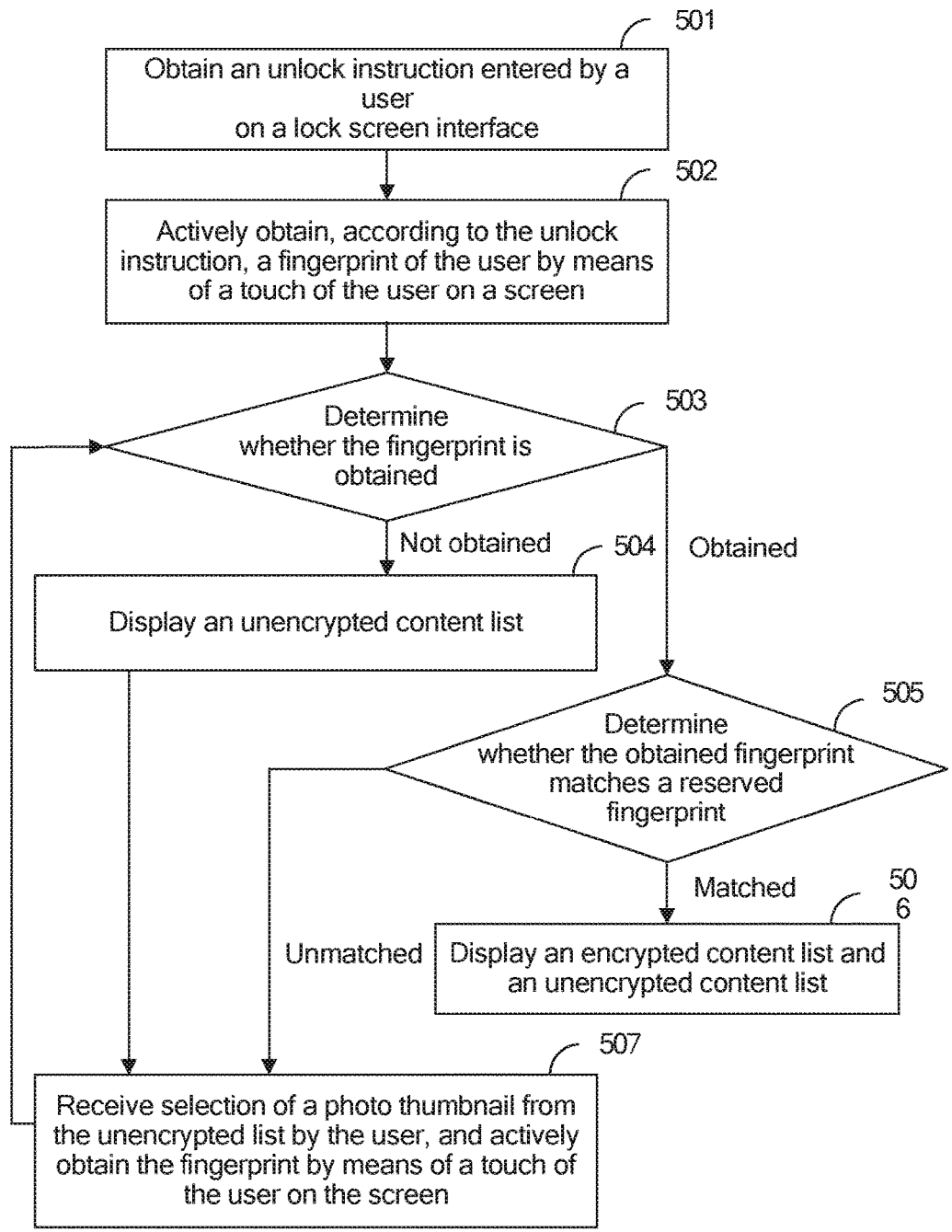
FIG. 5 shows a flowchart of a mobile terminal privacy protection method according to an embodiment of the present disclosure.

FIG. 5 shows a flowchart of a mobile terminal privacy protection method according to an embodiment of the present disclosure. The method shown in FIG. 5 is described using fingerprint collection as an example. As shown in FIG. 5, the method includes the following steps.

Step 501: Obtain an unlock instruction entered by a user on a lock screen interface.

Step 502: Actively obtain, according to the unlock instruction, a fingerprint of the user by means of a touch of the user on a screen.

Step 503: Determine whether the fingerprint is obtained, and if the fingerprint is not obtained, perform step 504, or if the fingerprint is obtained, perform step 505.

Step 504: Display an unencrypted content list, and perform step 507.

Referring to a schematic diagram of displaying an unencrypted content list according to an embodiment of the present disclosure shown in FIG. 3, an application scenario shown in FIG. 3 uses an album as an example. As shown in FIG. 3, unencrypted content only includes two photos 301 and 302 according to user setting.

Step 505: Determine whether the obtained fingerprint matches a reserved fingerprint, and if the obtained fingerprint matches the reserved fingerprint, perform step 506, or if the obtained fingerprint does not match the reserved fingerprint, perform step 507.

Step 506: Display an encrypted content list and an unencrypted content list.

Figure 6:
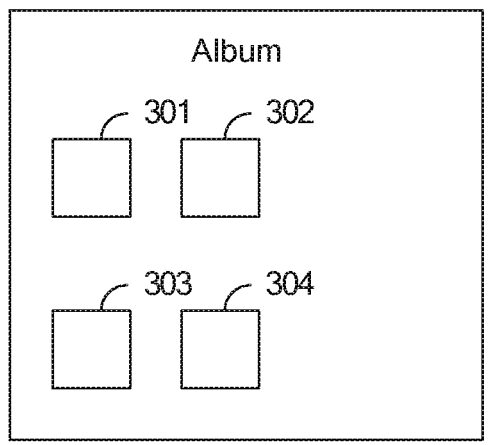
FIG. 6 shows a schematic diagram of displaying an encrypted content list and an unencrypted content list according to an embodiment of the present disclosure.

FIG. 6 shows a schematic diagram of displaying an encrypted content list and an unencrypted content list according to an embodiment of the present disclosure. An application scenario shown in FIG. 6 is the same as that shown in FIG. 3. As shown in FIG. 6, according to user setting, unencrypted photos are 301 and 302, and encrypted photos are 303, 304, and the like.

Step 507: Receive selection of a photo thumbnail from the unencrypted list by the user, actively obtain the fingerprint by means of a touch of the user on the screen, and perform step 503.

The mobile terminal privacy protection method according to this embodiment of the present disclosure can protect privacy in a mobile terminal without being easily perceived by a user.

Figure 7:
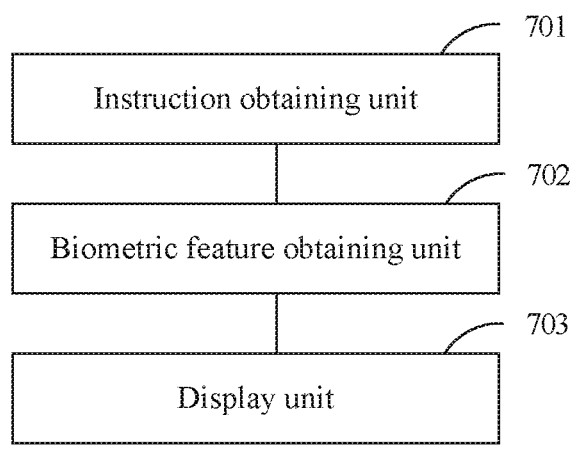
FIG. 7 shows a schematic structural diagram of a mobile terminal privacy protection apparatus according to an embodiment of the present disclosure.

FIG. 7 shows a schematic structural diagram of a mobile terminal privacy protection apparatus according to an embodiment of the present disclosure. As shown in FIG. 7, the apparatus includes an instruction obtaining unit 701 configured to obtain an application start instruction, a biometric feature obtaining unit 702 configured to actively obtain a biometric feature of a user according to the application start instruction, and a display unit 703 configured to display an encrypted content list and an unencrypted content list of a corresponding application if the obtained biometric feature of the user matches a preset biometric feature.

The encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature.

The display unit 703 is further configured to display the unencrypted content list of the application if the biometric feature of the user is not obtained, or the display unit 703 is further configured to display the unencrypted content list of the application if the obtained biometric feature of the user does not match the preset biometric feature.

In an embodiment of the present disclosure, the biometric feature obtaining unit 702 includes a photography subunit (not shown) configured to actively obtain a facial feature of the user, or the biometric feature obtaining unit 702 includes a photography subunit (not shown) configured to actively obtain an eye iris feature of the user, or the biometric feature obtaining unit 702 includes a fingerprint obtaining subunit (not shown) configured to actively obtain a fingerprint of the user.

In an embodiment of the present disclosure, the fingerprint obtaining subunit is further configured to actively obtain, using a touchscreen of the mobile terminal, a fingerprint entered by the user when operating the unencrypted content list.

The display unit 703 is further configured to display the encrypted content list of the application if the actively obtained fingerprint matches the preset biometric feature.

In an embodiment of the present disclosure, the instruction obtaining unit 701 is further configured to obtain a first instruction that is entered by the user to open a first entry in the encrypted content list.

The display unit 703 is further configured to present, according to the first instruction, content corresponding to the first entry.

The biometric feature obtaining unit 702 is further configured to obtain, according to the first instruction, a biometric feature entered by the user.

The apparatus further includes a setting unit (not shown) configured to set the first entry to an unencrypted state when the biometric feature entered by the user matches the preset biometric feature.

The instruction obtaining unit 701 is further configured to obtain a second instruction that is entered by the user to open a second entry in the unencrypted content list.

The display unit 703 is further configured to present, according to the second instruction, content corresponding to the second entry.

The biometric feature obtaining unit 702 is further configured to obtain, according to the second instruction, a biometric feature entered by the user.

The display unit 703 is further configured to set the second entry to an encrypted state when the biometric feature entered by the user matches the preset biometric feature.

In an embodiment of the present disclosure, the instruction obtaining unit 701 is further configured to obtain an unlock instruction entered by the user on a lock screen interface.

The biometric feature obtaining unit 702 is further configured to actively obtain the biometric feature of the user according to the unlock instruction.

The display unit 703 is further configured to display an encrypted application icon and an unencrypted application icon if the obtained biometric feature of the user matches the preset biometric feature.

The encrypted application icon is an application icon that is not presented when the obtained biometric feature of the user does not match the preset biometric feature.

The display unit 703 is further configured to display the unencrypted application icon if the biometric feature of the user is not obtained, or the display unit 703 is further configured to display the unencrypted application icon if the obtained biometric feature of the user does not match the preset biometric feature.

The apparatus further includes a geographic location and environment information obtaining unit (not shown) configured to obtain information about a geographic location and an environment in which the mobile terminal is located.

The biometric feature obtaining unit 702 is further configured to actively obtain the biometric feature of the user according to the application start instruction if the information about the geographic location in which the mobile terminal is located matches preset geographic location information and/or if the environment information matches preset environment information.

Obtaining geographic location information and environment information may further improve security of this embodiment of the present disclosure.

Figure 8:
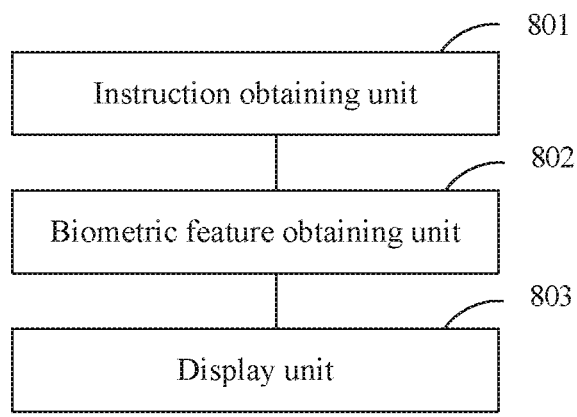
FIG. 8 shows a schematic structural diagram of a mobile terminal privacy protection apparatus according to an embodiment of the present disclosure.

FIG. 8 shows a schematic structural diagram of a mobile terminal protection apparatus according to an embodiment of the present disclosure. As shown in FIG. 8, the apparatus includes an instruction obtaining unit 801 configured to obtain an unlock instruction entered by a user on a lock screen interface, a biometric feature obtaining unit 802 configured to actively obtain a biometric feature of the user according to the unlock instruction, and a display unit 803 configured to present an unlocked first interface if the obtained biometric feature of the user matches a preset biometric feature, where interface elements of the first interface include an encrypted application icon and an unencrypted application icon.

The encrypted application icon is an application icon that is not presented when the obtained biometric feature of the user does not match the preset biometric feature.

The display unit 803 is further configured to present an unlocked second interface if the obtained biometric feature of the user does not match the preset biometric feature. An interface element of the second interface includes the unencrypted application icon.

In an embodiment of the present disclosure, the apparatus further includes a geographic location and environment information obtaining unit (not shown) configured to obtain information about a geographic location and an environment in which the mobile terminal is located.

The biometric feature obtaining unit 802 is further configured to actively obtain the biometric feature of the user according to the application start instruction if the information about the geographic location in which the mobile terminal is located matches preset geographic location information and/or if the environment information matches preset environment information.

The mobile terminal privacy protection apparatus according to this embodiment of the present disclosure can protect privacy in a mobile terminal without being easily perceived by another user in order to avoid embarrassment.

Figure 9:
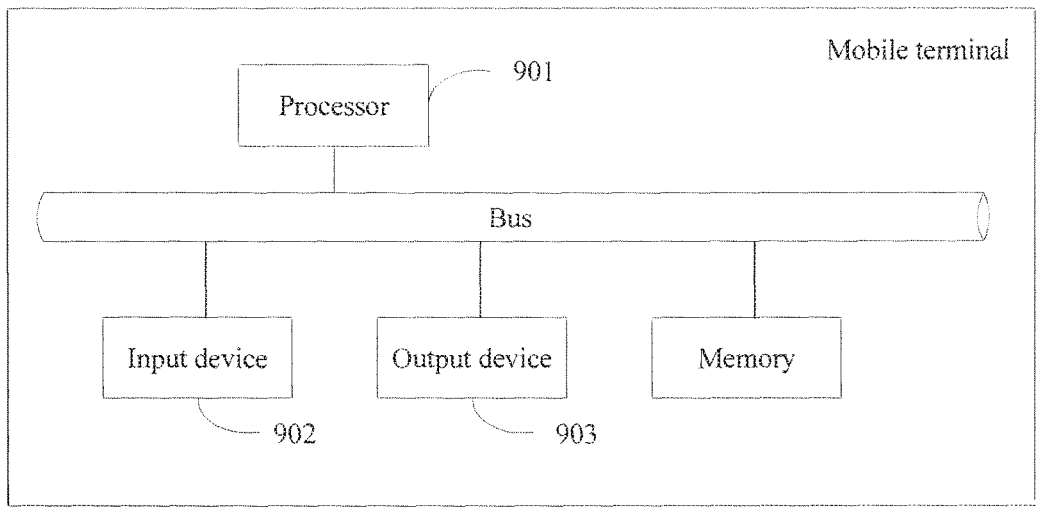
FIG. 9 shows a schematic structural diagram of a mobile terminal according to an embodiment of the present disclosure.

FIG. 9 shows a schematic structural diagram of a mobile terminal according to an embodiment of the present disclosure. As shown in FIG. 9, the mobile terminal includes a processor 901 configured to obtain an application start instruction, an input device 902 configured to actively obtain a biometric feature of a user according to the application start instruction, and an output device 903 configured to display an encrypted content list and an unencrypted content list of a corresponding application if the obtained biometric feature of the user matches a preset biometric feature. The mobile terminal further includes a memory and bus, where the processor 901, the input device 902, the output device 903 and the memory coupled to each other using the bus.

The encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature.

In an embodiment of the present disclosure, the output device 903 is further configured to display the unencrypted content list of the application if the biometric feature of the user is not obtained, or the output device 903 is further configured to display the unencrypted content list of the application if the obtained biometric feature of the user does not match the preset biometric feature.

In an embodiment of the present disclosure, the input device 902 is further configured to actively obtain a facial feature of the user, the input device 902 is further configured to actively obtain an eye iris feature of the user, or the input device 902 is further configured to actively obtain a fingerprint of the user.

In an embodiment of the present disclosure, the input device 902 is further configured to actively obtain, using a touchscreen (not shown) of the mobile terminal, a fingerprint entered by the user when operating the unencrypted content list.

The output device 903 is further configured to display the encrypted content list of the application if the actively obtained fingerprint matches the preset biometric feature.

In an embodiment of the present disclosure, the processor 901 is further configured to obtain a first instruction that is entered by the user to open a first entry in the encrypted content list.

The output device 903 is further configured to present, according to the first instruction, content corresponding to the first entry.

The input device 902 is further configured to obtain, according to the first instruction, a biometric feature entered by the user.

The processor 901 is further configured to set the first entry to an unencrypted state when the biometric feature entered by the user matches the preset biometric feature.

The processor 901 is further configured to obtain a second instruction that is entered by the user to open a second entry in the unencrypted content list.

The output device 903 is further configured to present, according to the second instruction, content corresponding to the second entry.

The input device 902 is further configured to obtain, according to the second instruction, a biometric feature entered by the user.

The processor 901 is further configured to set the second entry to an encrypted state when the biometric feature entered by the user matches the preset biometric feature.

In an embodiment of the present disclosure, the processor 901 is further configured to obtain an unlock instruction entered by the user on a lock screen interface.

The input device 902 is further configured to actively obtain the biometric feature of the user according to the unlock instruction.

The output device 903 is further configured to display an encrypted application icon and an unencrypted application icon if the obtained biometric feature of the user matches the preset biometric feature.

The encrypted application icon is an application icon that is not presented when the obtained biometric feature of the user does not match the preset biometric feature.

In an embodiment of the present disclosure, the output device 903 is further configured to display the unencrypted application icon if the biometric feature of the user is not obtained, or the output device 903 is further configured to display the unencrypted application icon if the obtained biometric feature of the user does not match the preset biometric feature.

In an embodiment of the present disclosure, the input device 902 is further configured to obtain information about a geographic location and an environment in which the mobile terminal is located.

The input device 902 is further configured to actively obtain the biometric feature of the user according to the application start instruction if the information about the geographic location in which the mobile terminal is located matches preset geographic location information and/or if the environment information matches preset environment information.

Figure 10:
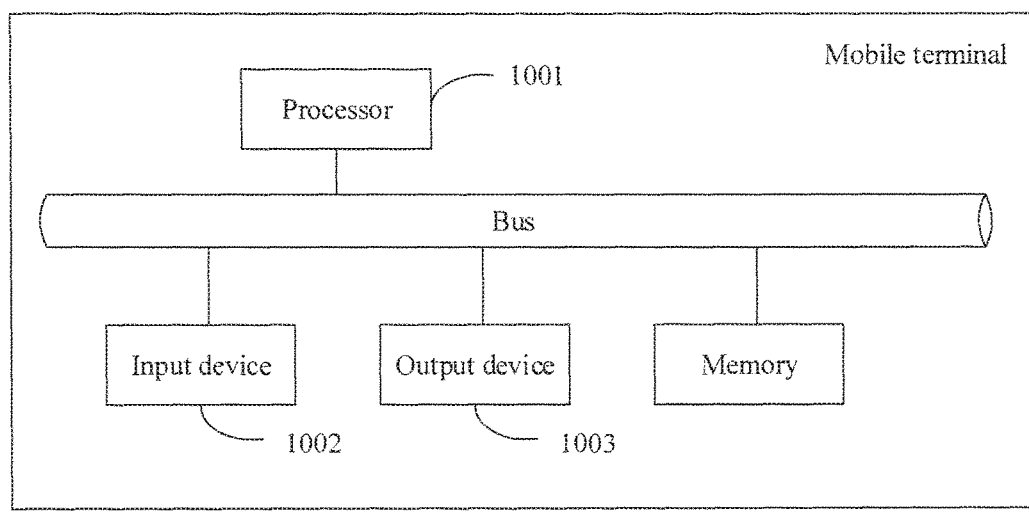
FIG. 10 shows a schematic structural diagram of a mobile terminal according to an embodiment of the present disclosure.

FIG. 10 shows a schematic structural diagram of a mobile terminal according to an embodiment of the present disclosure. As shown in FIG. 10, the mobile terminal includes a processor 1001 configured to obtain an unlock instruction entered by a user on a lock screen interface, an input device 1002 configured to actively obtain a biometric feature of the user according to the unlock instruction, and an output device 1003 configured to present an unlocked first interface if the obtained biometric feature of the user matches a preset biometric feature, where interface elements of the first interface include an encrypted application icon and an unencrypted application icon. The mobile terminal further includes a memory and bus, where the processor 1001, the input device 1002, the output device 1003 and the memory coupled to each other using the bus.

The encrypted application icon is an application icon that is not presented when the obtained biometric feature of the user does not match the preset biometric feature.

In an embodiment of the present disclosure, the output device 1003 is further configured to present an unlocked second interface if the obtained biometric feature of the user does not match the preset biometric feature. An interface element of the second interface includes the unencrypted application icon.

In an embodiment of the present disclosure, the input device 1002 is further configured to obtain information about a geographic location and an environment in which the mobile terminal is located.

The input device 1002 is further configured to actively obtain the biometric feature of the user according to the application start instruction if the information about the geographic location in which the mobile terminal is located matches preset geographic location information and/or if the environment information matches preset environment information.

The mobile terminal according to the present disclosure can protect user privacy, and the privacy protection is not easily perceived by another user in order to avoid embarrassment.

Embodiments of the present disclosure provide a mobile terminal privacy protection method and apparatus, and a mobile terminal. An application start instruction is obtained, a biometric feature of a user is actively obtained according to the application start instruction, and an encrypted content list and an unencrypted content list of a corresponding application are displayed if the obtained biometric feature of the user matches a preset biometric feature. The encrypted content list of the application is generated according to encrypted content in the application, the unencrypted content list of the application is generated according to unencrypted content in the application, and the encrypted content in the application is content that is not presented when the obtained biometric feature of the user does not match the preset biometric feature. The present disclosure can protect privacy in the mobile terminal without being easily perceived in order to avoid unnecessary embarrassment and improve using experience of the user.

A system embodiment basically corresponds to a method embodiment. For related parts, reference may be made to the parts in the method embodiment. The described system embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The present disclosure can be described in the general context of executable computer instructions executed by a computer, for example, a program module. Generally, the program unit includes a routine, program, object, component, data structure, and the like for executing a particular task or implementing a particular abstract data type. The present disclosure may also be practiced in distributed computing environments in which tasks are performed by remote processing devices that are connected through a communications network. In a distributed computing environment, program modules may be located in both local and remote computer storage media including storage devices.

A person of ordinary skill in the art may understand that all or a part of the steps of the method embodiments may be implemented by a program instructing relevant hardware. The program may be stored in a computer readable storage medium, such as a read-only memory (ROM), a random access memory (RAM), a magnetic disk, or an optical disc.

It should be noted that in this specification, relational terms such as first and second are only used to distinguish one entity or operation from another, and do not necessarily require or imply that any actual relationship or sequence exists between these entities or operations. Moreover, the terms "include," "comprise," or their any other variant is intended to cover a non-exclusive inclusion such that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

In short, the foregoing descriptions are merely examples of embodiments of the present disclosure, but are not intended to limit the protection scope of the present disclosure. Specific examples are used in this specification to describe the principle and implementation manners of the present disclosure. The descriptions of the foregoing embodiments are merely intended to help understand the method and core idea of the present disclosure. In addition, a person skilled in the art may, according to the idea of the present disclosure, make modifications with respect to the specific implementation manners and the application scope. Therefore, the content of this specification shall not be construed as a limitation to the present disclosure. Therefore, the content of this specification shall not be construed as a limitation to the present disclosure. Any modification, equivalent replacement, or improvement made without departing from the spirit and principle of the present disclosure shall fall within the protection scope of the present disclosure.

What is claimed is:

1. A mobile terminal privacy protection method, comprising:
    obtaining an application start instruction;
    actively obtaining a biometric feature of a user according to the application start instruction; and
    displaying an encrypted content list and an unencrypted content list of an application when the obtained biometric feature of the user matches a preset biometric feature,
    wherein the encrypted content list of the application is generated according to encrypted content in the application,
    wherein the unencrypted content list of the application is generated according to unencrypted content in the application, and
    wherein the encrypted content in the application is content that is not presented when the obtained biometric feature of the user does not match the preset biometric feature,
    wherein before obtaining the application start instruction, the method further comprises:
        obtaining an unlock instruction entered by the user on a lock screen interface;
        actively obtaining the biometric feature of the user according to the unlock instruction;
        displaying an encrypted application icon and an unencrypted application icon when the obtained biometric feature of the user matches the preset biometric feature; and
        displaying the unencrypted application icon when the biometric feature of the user is not obtained and when the obtained biometric feature of the user does not match the preset biometric feature.

2. The method according to claim 1, wherein after actively obtaining the biometric feature of the user, the method further comprises:
    displaying the unencrypted content list of the application when the biometric feature of the user is not obtained; and
    displaying the unencrypted content list of the application when the obtained biometric feature of the user does not match the preset biometric feature.

3. The method according to claim 1, wherein actively obtaining the biometric feature of the user comprises:
    actively obtaining a facial feature of the user;
    actively obtaining an eye iris feature of the user; or
    actively obtaining a fingerprint of the user.

4. The method according to claim 2, wherein after displaying the unencrypted content list of the application, the method further comprises:
    actively obtaining, using a touchscreen of a mobile terminal, a fingerprint entered by the user when operating the unencrypted content list; and
    displaying the encrypted content list and the unencrypted content list of the application when the actively obtained fingerprint matches the preset biometric feature.

5. The method according to claim 2, wherein after displaying the encrypted content list and the unencrypted content list of the application, the method further comprises:
    obtaining a first instruction entered by the user to open a first entry in the encrypted content list;
    presenting, according to the first instruction, content corresponding to the first entry;
    obtaining, according to the first instruction, a biometric feature entered by the user; and
    setting the first entry to an unencrypted state when the biometric feature entered by the user matches the preset biometric feature.

6. The method according to claim 2, wherein after displaying the encrypted content list and the unencrypted content list of the application, the method further comprises:
    obtaining a second instruction entered by the user to open a second entry in the unencrypted content list;
    presenting, according to the second instruction, content corresponding to the second entry;
    obtaining, according to the second instruction, a biometric feature entered by the user; and
    setting the second entry to an encrypted state when the biometric feature entered by the user matches the preset biometric feature.

7. The method according to claim 1, wherein actively obtaining the biometric feature of the user further comprises:
    obtaining information about a geographic location and an environment in which a mobile terminal is located; and
    when the information about the geographic location in which the mobile terminal is located matches preset geographic location information or when the environment information matches preset environment information.

8. A mobile terminal privacy protection method, comprising:
    obtaining an unlock instruction entered by a user on a lock screen interface;
    actively obtaining a biometric feature of the user according to the unlock instruction; and presenting an unlocked first interface when the obtained biometric feature of the user matches a preset biometric feature;

presenting a second unlocked interface when the obtained biometric feature of the user does not match the preset biometric feature, wherein an interface element of the unlocked second interface comprises an unencrypted application icon, wherein interface elements of the unlocked first interface comprise an encrypted application icon and the unencrypted application icon, and wherein the encrypted application icon is an application icon that is not presented when the obtained biometric feature of the user does not match the preset biometric feature.

9. The mobile terminal privacy protection method according to claim 8, wherein actively obtaining the biometric feature of the user further comprises:

obtaining information about a geographic location and an environment in which a mobile terminal is located; and actively obtaining the biometric feature of the user according to an application start instruction when the information about the geographic location in which the mobile terminal is located matches preset geographic location information or when the environment information matches preset environment information.

10. A mobile terminal, comprising:

a processor configured to obtain an application start instruction;

an input device coupled to the processor and configured to actively obtain a biometric feature of a user according to the application start instruction; and an output device coupled to the processor and the input device and configured to display an encrypted content list and an unencrypted content list of an application when the obtained biometric feature of the user matches a preset biometric feature, wherein the encrypted content list of the application is generated according to encrypted content in the application, wherein the unencrypted content list of the application is generated according to unencrypted content in the application, and wherein the encrypted content in the application is content that is not presented when the obtained biometric feature of the user does not match the preset biometric feature, wherein the processor is further configured to obtain an unlock instruction entered by the user on a lock screen interface;

actively obtain the biometric feature of the user according to the unlock instruction;

display an encrypted application icon and an unencrypted application icon when the obtained biometric feature of the user matches the preset biometric feature; and display the unencrypted application icon when the biometric feature of the user is not obtained and when the obtained biometric feature of the user does not match the preset biometric feature.

11. The mobile terminal according to claim 10, wherein the input device is further configured to:

actively obtain a facial feature of the user;

the input device is further configured to actively obtain an eye iris feature of the user; or the input device is further configured to actively obtain a fingerprint of the user.

12. The mobile terminal according to claim 10, wherein the input device is further configured to actively obtain, using a touchscreen of the mobile terminal, a fingerprint entered by the user when operating the unencrypted content list, and wherein the output device is further configured to display the encrypted content list and the unencrypted content list of the application when the actively obtained fingerprint matches the preset biometric feature.

13. The mobile terminal according to claim 10, wherein the processor is further configured to obtain a first instruction entered by the user to open a first entry in the encrypted content list, wherein the output device is further configured to present, according to the first instruction, content corresponding to the first entry, wherein the input device is further configured to obtain, according to the first instruction, a biometric feature entered by the user, and wherein the processor is further configured to set the first entry to an unencrypted state when the biometric feature entered by the user matches the preset biometric feature.

14. The mobile terminal according to claim 10, wherein the processor is further configured to obtain a second instruction entered by the user to open a second entry in the unencrypted content list, wherein the output device is further configured to present, according to the second instruction, content corresponding to the second entry, wherein the input device is further configured to obtain, according to the second instruction, a biometric feature entered by the user, and wherein the processor is further configured to set the second entry to an encrypted state when the biometric feature entered by the user matches the preset biometric feature.

15. The mobile terminal according to claim 10, wherein the input device is further configured to:

obtain information about a geographic location and an environment in which the mobile terminal is located; and actively obtain the biometric feature of the user according to the application start instruction when the information about the geographic location in which the mobile terminal is located matches preset geographic location information or when the environment information matches preset environment information.

* * * * *